Nov. 30, 1943.     D. C. SCOTT     2,335,455
TRANSMISSION OF MOTION TO CYLINDRICAL DRUMS
Filed Dec. 30, 1942
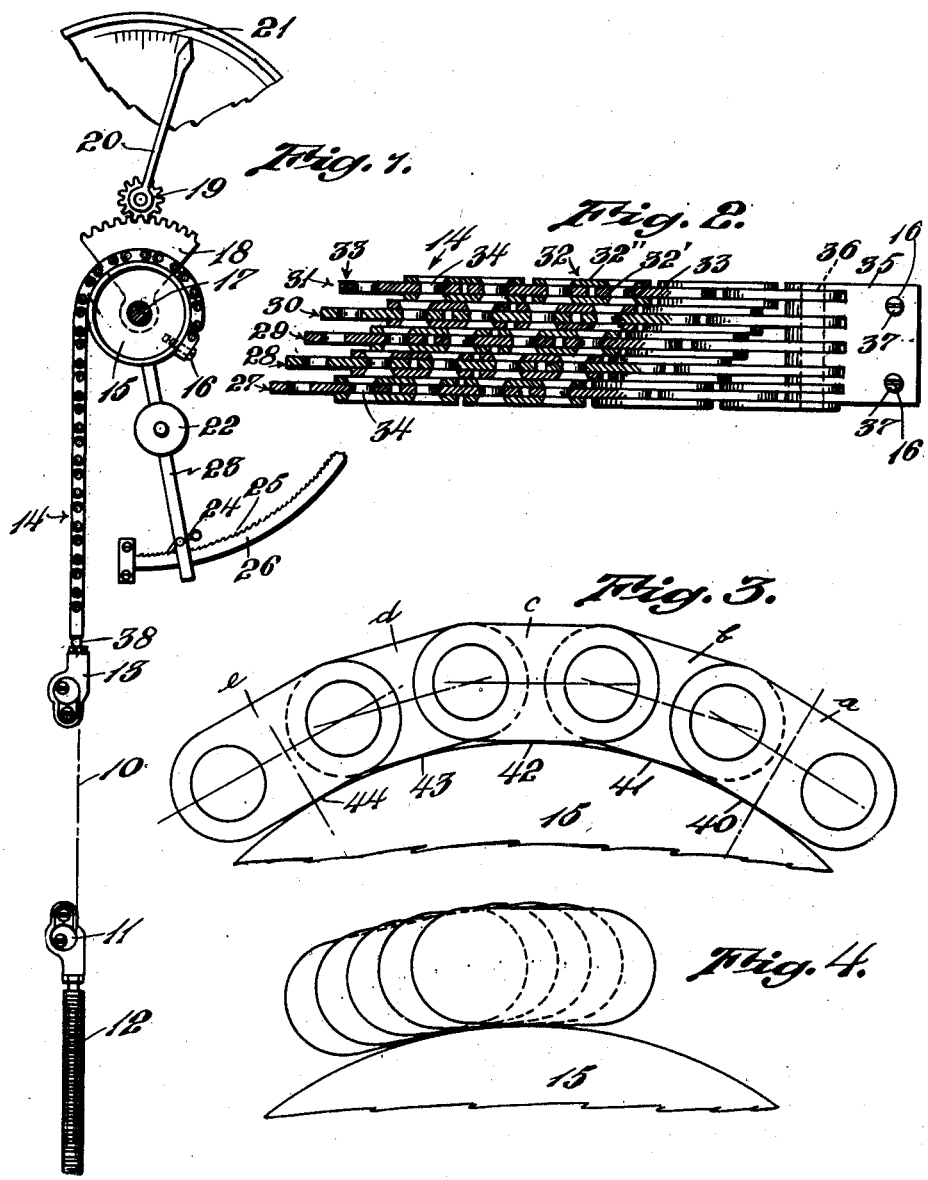
INVENTOR
David C. Scott
BY Barlow & Barlow
ATTORNEYS Patented Nov. 30, 1943

2,335,455

UNITED STATES PATENT OFFICE 2,335,455

TRANSMISSION OF MOTION TO CYLINDRICAL DRUMS

David C. Scott, Providence, R. I., assignor to Henry L. Scott Company, a corporation of Rhode Island Application December 30, 1942, Serial No. 470,553

3 Claims. (Cl. 74—216.5)

This invention relates to the transmission of motion in a linear direction to a cylindrical drum for the operation of some member by reason of the movement of the drum.

In testing machines, weighing machines and the like a pointer is often moved by motion of a drum about its axis. The movement transmitted to the drum is received from some rectilinear moving part such for instance as the movement imparted to a specimen clamp or the like. One ideal way of transmitting such motion is by means of steel band extending from the specimen clamp about the drum. However, where heavy loads are to be encountered and a rather heavy band must be used to withstand the strains encountered, errors in the transmission of motion are found to exist due to the springing of the band outwardly away from the drum which occurs particularly during relatively light loads. A link chain has been considered for the purpose of such transmission of motion but errors also occur in the use of a link chain due to the flat sides of the links which cannot make a perfect circle about the drum and the more that the chain is wound upon the drum the greater will be the error which will exist under these circumstances.

One of the objects of this invention is to provide an arrangement for transmitting motion from a clamp to a cylindrical drum which will reduce the error which creeps in to constructions above indicated so that the transmission of motion over the entire range of operation will be more accurate.

Another object of the invention is to provide a link type of chain but reduce the error caused by flat sides or lengths of the links of the chain.

With these and other objects in view, the invention consists of certain novel features of construction, as will be more fully described and particularly pointed out in the appended claims.

In the accompanying drawing:

Fig. 1 is a fragmental view illustrating somewhat diagrammatically the relationship of a test specimen, a dial to illustrate the pull on the specimens and a connection between the movement of the specimen and the dial indicating correspondence of the movement of the two;

Fig. 2 illustrates a plurality of chains arranged in parallel relation partly shown in section, the remainder being shown in top plan view;

Fig. 3 is a diagrammatic view illustrating several links of the chain trained about a cylindrical portion of a drum;

Fig. 4 is a diagrammatic view illustrating the relative position of five links of a plurality of side by side chains with the pivots of the links of the several parallel chains progressively advanced.

To improve upon the link type chain which has the objection of a plurality of flat sides I have provided a plurality of smaller chains with shorter links and with the pivots of the links arranged so that they will not be in lateral alignment. This may be conveniently done by arranging the links in echelon relation laterally of the chain so that in effect the flat sides of the links are so shortened that they very closely approach a true cylindrical surface.

With reference to the drawing I have illustrated diagrammatically a testing machine wherein there is a specimen 10 engaged at one end by a clamp 11 supported upon a threaded rod 12 to which motion is imparted by the rotation of some part having threaded engagement with this portion 12. The other end of the specimen is engaged by a clamp 13 to which there is connected a link chain 14 which is trained about a drum 15 and secured to this drum by means of bolts 16. The drum is keyed to a shaft 17 which carries a segmental gear 18 engaging a pinion 19 rotated thereby, which in turn carries and operates a pointer 20 moving over the scale 21. A counterweight 22 is supported upon arm 23 which also moves with the shaft 17 so that its pall 24 will engage the rack teeth 25 of the arcuate segment 26 so as to hold the pointer in position when the specimen breaks.

The motion transmitting means from the clamp 13 to the drum 15 and which is indicated generally by the numeral 14 constitutes the improvement of this invention. The means designated generally 14 consists of a plurality of individual chains here shown as five and designed as 27, 28, 29, 30, and 31 as shown in Fig. 2. Each of these chains is of the sprocket type consisting of a link 32 comprising double bars 32' and 32" and a link 33 consisting of a single bar with its end sandwiched between the double bar links 32 and held in pivotal relation therewith by a hollow or solid rivet 34. The links in the chain 31 are the same as the links in the chains 27 to 30 inclusive but the arrangement of the chains 27 to 31 is such that the corresponding links laterally across the group of chains are arranged in echelon relation such as shown by the links 33 extending at the left-hand end of the chains in Fig. 2. The pivots 34 are not in alignment but are arranged progressively one in advance of the other so that as the chain flexes there is a more close approximation of a cylindrical surface by reason of a greater number of flat sides of short extent than when a single chain is flexed about a cylinder such as about the cylinder 15 as indicated in Fig. 3. This plurality of chains are suitably secured together by an end member 35. Specially formed links are pivoted as at 36 to connect the end member 35 to the links of each chain. The end member is provided with openings 37 through which securing means 16 may be placed for attachment to the drum 15 while at the other end a similar arrangement may be provided for joining a plurality of chains into an end assembly as at 38 which serves as a means for connecting this plurality of chains together and to a clamp 13.

An edge view on an enlarged scale of the chain 27 trained about the drum 15 will show that the link $a$ connected to the link $b$ and to the links $c$, $d$, and $e$ will form a plurality of flat sides designated 40, 41, 42, 43, and 44 along the cylindrical surface 15 each of which is of a substantial extent. However, if the five chains are viewed as shown in Fig. 4 where there is one link of each illustrated each of which is of the same size as shown in Fig. 3, it will appear that for this plurality each one of the sides 40 to 44 is of only one-fifth the extent shown in Fig. 3 where a single chain appears and there is five times the contact with the drum over the same angular extent therefore the flat sides are in effect one-fifth of the length or more nearly approximate to a circle for the effective transmission of linear movement with reduction of distortion due to the contact being out of a true cylindrical surface. It is apparent that this multiplication of chains with out of line pivots may be continued to the extent necessary to provide a practical result and to minimize the error of transmission of linear movement by reason of the distortion which occurs in a linked arrangement.

I claim:

1. In a machine of the character described, a cylindrical drum means for transmitting motion to said drum comprising a plurality of link chains arranged in parallel relation and trained over said drum each chain comprising links pivoted one to the other to flex about said drum, the pivots of said links of the chains being staggered laterally of the chain within the longitudinal extent of one of the links to provide for the group of chains pivotal points within the length of the individual links.

2. In a machine of the character described, a cylindrical drum means for transmitting motion to said drum comprising a plurality of link chains arranged in parallel relation and trained over said drum each chain comprising links pivoted one to the other to flex about said drum, the pivots of said links of the chains being progressively advanced laterally of the group of chains and within the extent of length of one of the links of the chain.

3. In a machine of the character described, a cylindrical drum means for transmitting motion to said drum comprising a plurality of link chains arranged in parallel relation and trained over said drum each chain comprising links pivoted one to the other to flex about said drum, said links being arranged in echelon relation laterally of the group of chains and within the space of the longitudinal length of a link.

DAVID C. SCOTT.